United States Patent
Lu et al.

(10) Patent No.: US 10,636,137 B1
(45) Date of Patent: Apr. 28, 2020

(54) SYSTEM FOR DETERMINING OBJECT ORIENTATIONS IN AN IMAGE

(71) Applicant: Amazon Technologies, Inc., Seattle, WA (US)

(72) Inventors: Yang Lu, Seattle, WA (US); Yongning Wu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 158 days.

(21) Appl. No.: 15/791,172

(22) Filed: Oct. 23, 2017

(51) Int. Cl.
*G06K 9/00* (2006.01)
*G06T 7/00* (2017.01)
*G06T 7/80* (2017.01)
*G06T 7/73* (2017.01)

(52) U.S. Cl.
CPC .......... *G06T 7/0008* (2013.01); *G06T 7/0006* (2013.01); *G06T 7/73* (2017.01); *G06T 7/80* (2017.01)

(58) Field of Classification Search
CPC ......... G06T 7/008; G06T 7/80; G06T 7/0006; G06T 7/73
See application file for complete search history.

(56) References Cited

U.S. PATENT DOCUMENTS

| | | | | |
|---|---|---|---|---|
| 5,990,900 A * | 11/1999 | Seago | ..................... | G06T 7/536 345/419 |
| 8,059,154 B1 * | 11/2011 | Kiro | ..................... | H04N 17/002 348/184 |
| 8,872,925 B2 * | 10/2014 | Xie | ........................ | G06T 7/80 348/207.99 |
| 2008/0208547 A1 * | 8/2008 | Kim | ........................ | G06T 7/536 703/2 |
| 2009/0290758 A1 * | 11/2009 | Ng-Thow-Hing | ........ | G06T 7/73 382/106 |
| 2010/0287511 A1 * | 11/2010 | Meier | ..................... | G06T 15/20 715/848 |
| 2012/0269388 A1 * | 10/2012 | Jiang | ..................... | G01C 11/00 382/103 |
| 2013/0243306 A1 * | 9/2013 | Falco, Jr. | .............. | G06T 19/006 382/154 |
| 2013/0322767 A1 * | 12/2013 | Chao | .................... | G06K 9/4604 382/199 |
| 2013/0335575 A1 * | 12/2013 | Tsin | .......................... | G06T 7/75 348/169 |
| 2014/0016138 A1 * | 1/2014 | Barbier | .................. | G01B 11/14 356/614 |
| 2014/0104437 A1 * | 4/2014 | Chao | .................... | H04N 17/002 348/187 |

(Continued)

*Primary Examiner* — Aaron W Carter
(74) *Attorney, Agent, or Firm* — Lee & Hayes, P.C.

(57) ABSTRACT

An image analysis system automatically determines a positioning and orientation of objects in an image. The image analysis system may be configured to evaluate images and determine whether the orientation and position of objects depicted in the images meet acceptable parameters. The image analysis system may process image data associated with an image to identify edges present in the image, and determine object lines based on the edges. Once the lines are identified, the image analysis system determines vanishing points for sets of the object lines. The image analysis system may then estimate camera parameters and determine the orientation of the objects as depicted in the image based on the vanishing points.

20 Claims, 8 Drawing Sheets

(56) References Cited

U.S. PATENT DOCUMENTS

| | | | |
|---|---|---|---|
| 2014/0125666 A1* | 5/2014 | Noh | H04N 13/128 |
| | | | 345/421 |
| 2014/0300547 A1* | 10/2014 | Hosenpud | G06F 3/011 |
| | | | 345/158 |
| 2015/0160539 A1* | 6/2015 | Bassi | G06T 7/80 |
| | | | 353/69 |
| 2015/0288878 A1* | 10/2015 | Bae | H04N 5/23229 |
| | | | 348/169 |
| 2016/0012593 A1* | 1/2016 | Chao | G06K 9/4604 |
| | | | 382/209 |
| 2016/0098095 A1* | 4/2016 | Gonzalez-Banos | G06F 3/017 |
| | | | 345/156 |
| 2017/0200310 A1* | 7/2017 | Kapinos | G06T 19/003 |
| 2017/0347030 A1* | 11/2017 | Guerreiro | H04N 5/23238 |
| 2018/0056873 A1* | 3/2018 | Lee | G06T 3/60 |
| 2018/0189955 A1* | 7/2018 | Moshe | G06T 7/13 |
| 2019/0147622 A1* | 5/2019 | Li | G01C 11/08 |

* cited by examiner

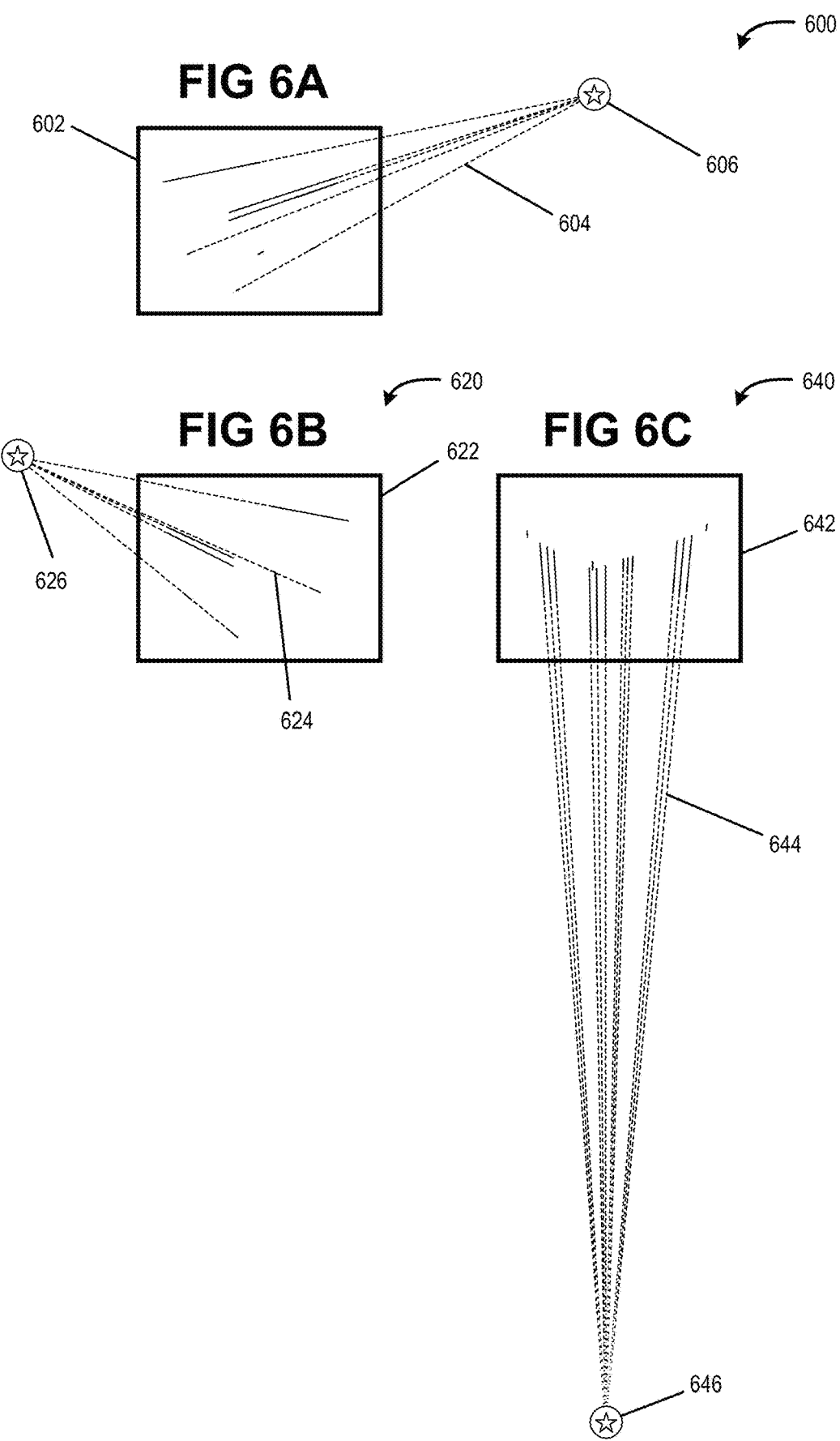

SYSTEM FOR DETERMINING OBJECT ORIENTATIONS IN AN IMAGE

BACKGROUND

Technical systems often need to analyze images based on the orientation of the objects they depict. For example, when selecting among many images that depict an item of furniture, a technical device may need to evaluate each image based on whether the item of furniture is positioned and/or oriented within the image in accordance with certain rules. However, having humans evaluating each image is not tenable, as the time and manpower required to analyze each image is exorbitant.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 6A, 6B, and 6C are schematic diagrams that vanishing points where different sets of lines from an image meet.

DETAILED DESCRIPTION

Figure 1:
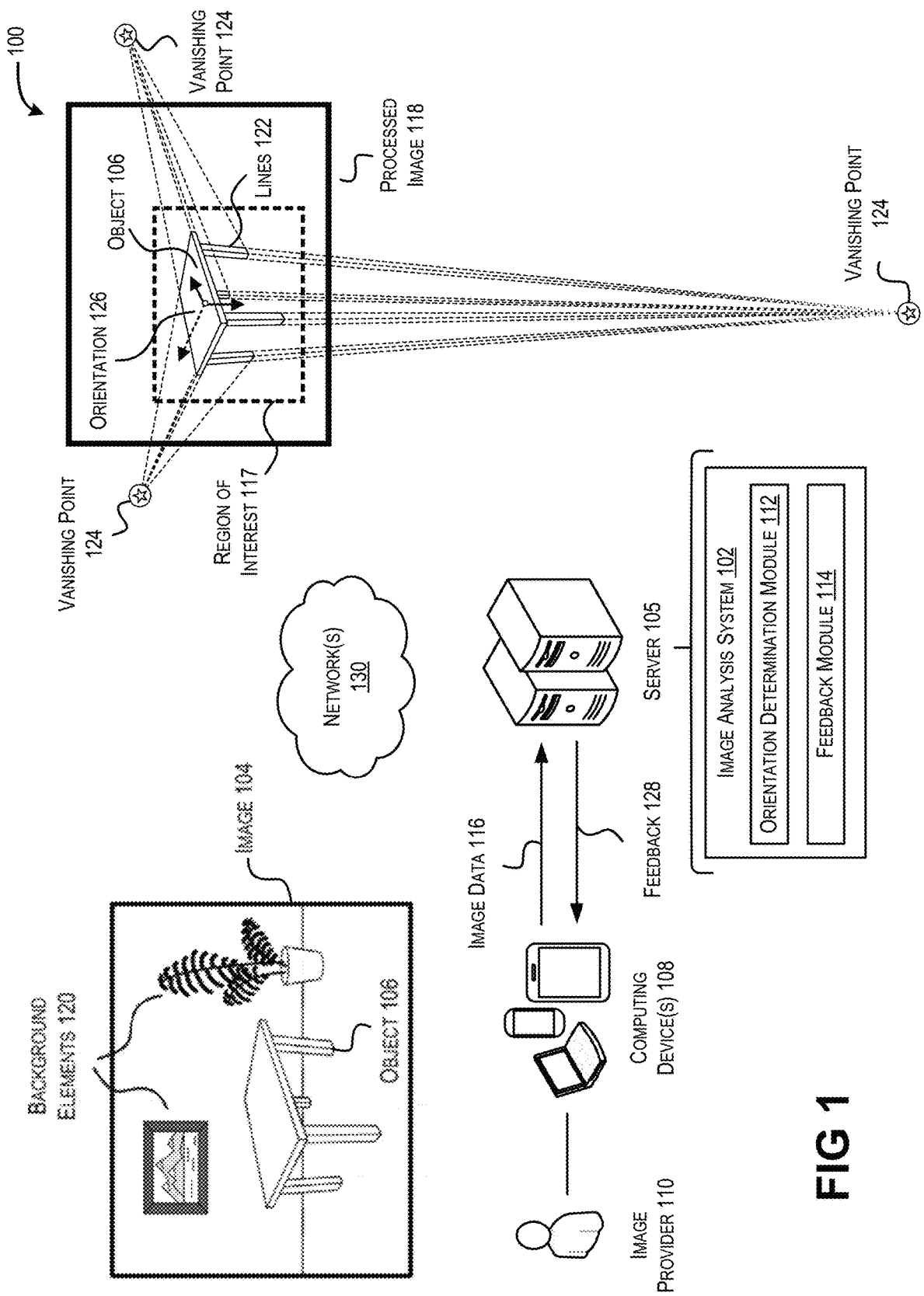
FIG. 1 is a schematic diagram of an illustrative environment for automatically reviewing object position and orientation in an uploaded image.

This disclosure is generally directed to an image analysis system and method for automatically determining the positioning and orientation of objects in an image. The orientation of an object includes the relative position of the axis of the object (i.e., x-axis, y-axis, z-axis, etc.) in relation to the axis of the image. In some embodiments, the orientation of an object may be described using the angular rotation/angular difference between individual axis' of the object in relation to the corresponding axis of the image, such as roll (i.e., z-axis difference), pitch (i.e., x-axis difference), and yaw (i.e., y-axis difference). The image analysis service may be implemented as part of an ecommerce platform that offers items and/or services to consumers. The ecommerce platform may be a website, electronic application, widget, or other electronic software platform that enables consumers to obtain items (i.e., goods, products, services, etc.) from a merchant. The ecommerce platform may present interfaces that include images of the items.

The image analysis system may receive the images from the merchants, or from other individuals. The images may be uploaded via an application or website interface associated with the image analysis system. For example, an image uploader may upload an image via an application executing on their computing device.

Alternatively, or in addition, the image analysis service may be implemented on a camera or a computing device associated with a camera. The image analysis service may determine the orientation of objects in images captured using the camera, or may determine the orientation of objects that the camera is currently viewing. In some embodiments, the image analysis service may cause a representation of the orientation of an object and/or feedback on a display of the camera or a computing device associated with the camera.

The image analysis system may then process the image to determine the position and/or orientation of one or more objects within the image. The image analysis system may process the entire image, or may process a portion of the image that corresponds to a region of interest. In some embodiments, a region of interest may be selected by the image provider or another individual. For example, when uploading an image the image provider may be given the option of identifying an object in the image, and/or a region of interest associated with the object. Alternatively, or in addition, the image analysis system may automatically determine the region of interest. For example, processing an image may include determining that the image includes an object, determining a location of the object in the image, and then determining a region of interest in the image that includes the object.

In addition to detecting the location of an object in the image, the image analysis system may determine one or more shapes associated with the object. For example, the image analysis system may determine that the object includes a rectangular surface. Alternatively, the system may determine one or more shapes associated with the object based on information associated with the image and/or item associated with the image. For example, where the image is associated with a round coffee table, the image analysis system may determine that the image will contain a circle based on information associated with the coffee table (e.g., item description, merchant selections, image provider inputs, other information, etc.).

In some embodiments, processing the image may include modifying the image to remove elements other than the object. For example, once the image analysis system has identified an object in an image, the image analysis system may remove portions of the image that do not correspond to the object (e.g., backgrounds, walls, floors, other objects in the image, etc.). In this way, the image analysis system may generate a processed image that includes the object and minimal other elements (e.g., the object on a blank/white/muted background). The image analysis system may then perform further processing steps on the region of interest, the processed image, or a combination thereof.

The image analysis system may then determine one or more lines or edges that are present in the image. For example, the image analysis system may use one or more line detection algorithms (e.g., Canny edge detection) to identify lines that are present in the region of interest, the processed image, or a combination thereof. The image analysis system may then estimate vanishing points for the object based on the lines that the image analysis system determined in the image. A vanishing point is an abstract point on an image plane where parallel lines in a 2D image depicting a 3D space appear to converge. Determining vanishing points may correspond to extending the lines identified within the image, and/or identifying points where sets of one or more of the lines identified in the image would converge.

When determining vanishing points, the image analysis system may identify the strongest vanishing points for the image. In some embodiments, the image analysis system may identify a preset number of vanishing points (e.g., the strongest 3 vanishing points), or may identify the vanishing points that have a sufficient strength (e.g., where at least 4 lines meet, where multiple lines cross within a region of space, etc.). Alternatively, or in addition, the image analysis system may decide the number of vanishing points that are to be determined based on the object. For example, where the image analysis system has identified that the object has a rectangular top surface, the image analysis system may search for the strongest three vanishing points.

The image analysis system may then determine the orientation of the object in the image based on the vanishing points. In some embodiments, the image analysis system may use the vanishing points to estimate parameters of the camera that took the image (e.g., the focal length of a lens of the camera), and determine the orientation of the object with relation to the orientation of the image. The image analysis system may then access image rules for the image. The image rules may specify one or more parameters for the positioning and orientation of objects in images. For example, the image rules may specify that the center of the object in the image must be located within a certain threshold of the center of the image, a ratio of the size of the object to the size of the image, a range of orientations of the object in relation to the camera, etc. The image analysis system may then label the image to reflect the orientation of the object as depicted in the image. In some embodiments, the image analysis system may determine whether to approve the image based on the determined orientation of the object and the image rules.

In some embodiments, when the image analysis system determines that the orientation of the object does not satisfy the image rules, the image analysis system may provide feedback to the image provider. The feedback may include a description of why the image was rejected, instructions for taking an image that will satisfy the image rules, or a combination thereof. In some embodiments, where the orientation of the object is within a threshold distance of satisfying the rules (e.g., the roll of the object is within 10 degrees of acceptable the range of values specified by the image rules), the image analysis system may perform one or more processing operations to automatically adjust the image so that the object is presented having an ideal orientation.

The techniques, apparatuses, and systems described herein may be implemented in a number of ways. Example implementations are provided below with reference to the following figures.

FIG. 1 is a schematic diagram of an illustrative environment 100 for automatically evaluating images based on object orientation. The environment 100 includes image analysis system 102 that is configured to process an image 104 and determine the orientation of objects 106 within the image 104. The image analysis system 102 may be run (i.e., stored, hosted, executed, etc.) on a computing entity, such as a smartphone, smart camera, tablet, personal computer, laptop, voice controlled computing device, server system, or other computing system that is able to execute and/or present one or more functionalities associated with the image analysis system 102.

FIG. 1 shows the image analysis system 102 as being hosted by server 105, which may be any entity, server(s), platform, etc. In some embodiments, the image analysis system 102 may be associated with or incorporated into an another service that utilizes image 104, such as a social media service that utilizes image 104, an image hosting service, an ecommerce service associated with an electronic marketplace (e.g., a website, electronic application, widget, etc.) that utilize images 104 to assist user is in search, browsing, viewing, and/or acquiring (i.e., for purchase, rent, lease, borrow, download, etc.) goods and/or services, etc.

FIG. 1 also shows image data 116 associated with image 104 being uploaded to the image analysis system 102 from one or more computing devices 108 associated with an user 110. The computing devices 108 may be any type of computing device, such as a smartphone, smart camera, tablet, personal computer, laptop, voice controlled computing device, or other device that is capable of acquiring image (e.g., taking a picture, obtaining a picture from a camera, other computing device, etc.). In some embodiments, the image analysis system 102 may be an application executing at least partially on computing devices 108.

The image analysis system 102 may include an orientation determination module 112 that is configured to perform one or more processes on an image 104 to determine the position and/or orientation of an object 106 as depicted in the image 104, and a feedback module 114 that is configured to provide feedback to one or more of the computing device and the user 110. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other instances, any or all of the modules can be implemented in whole or in part by hardware (e.g., a specialized processing unit, etc.) to execute the described functions. In various implementations, the modules described herein in association with image analysis system 102 can be executed across multiple devices.

The orientation of an object 106 includes the relative position of the axis of the object 106 (i.e., x-axis, y-axis, z-axis, etc.) in relation to the axis of the image. In some embodiments, the orientation of an object 106 may be described using the angular rotation/angular difference between individual axis' of the object 106 in relation to the corresponding axis of the image, such as the roll (i.e., z-axis difference), pitch (i.e., x-axis difference), and yaw (i.e., y-axis difference).

In some embodiments, the one or more processes performed by the image analysis system 102 on image 104 may include determining a region of interest 117 in the image 104. The image analysis system 102 may perform the one or more processes on the entire image 104, or the portion of the image 104 that corresponds to a region of interest 117, or a combination thereof. The region of interest 117 may be determined based on a selection by the user 110 or another individual. For example, where the user 110 is providing the image 104 via an application associated with the image analysis system 102 (e.g., application, browser application, etc.), the application may present one or more functionalities that enable the user 110 to identify an object 106 depicted in the image 104, and/or a region of interest 117 associated with the object 106.

Alternatively, or in addition, the image analysis system 102 may automatically determine the region of interest. For example, the one or more processes on the image 104 may include scanning the image data 116 associated with the image 104 to determine that the image 104 includes an object 106, and/or determining a location of the object 106 in the image 104. Once the image analysis system 102 has identified the location of the object 106 in the image 104, the image analysis system 102 may determine a region of interest 117 in the image 104 that includes the object 106.

In some embodiments, the one or more processes performed by the image analysis system 102 may include determining one or more shapes associated with the object 106. For example, the image analysis system 102 may determine that the object 106 includes a circular top. Alternatively, the image analysis system 102 may determine one or more shapes associated with the object 106 based on information associated with the image 104. For example, where the image 104 is associated with a rectangular refrigerator, the image analysis system 102 may determine that the object 106 will contain multiple rectangles based on information associated with the refrigerator (e.g., item description, merchant selections, user 110 inputs, other information accessible to the image analysis system 102, etc.).

The one or more processes performed by the image analysis system 102 on image 104 may also include generating a processed image 118 associated with the image 118. In some embodiments, the processed image 118 may correspond to a modified version of the image 104, but with one or more background elements 120 removed. For example, once the image analysis system 102 has identified the object 106 in the image 104, the image analysis system 102 generate the processed image 118 by removing or ignoring portions of the image 104 that do not correspond to the object 106, such as backgrounds, walls, floors, other objects in the image, etc. In this way, the image analysis system 102 may generate the processed image 118 that includes the object 116 and minimal other elements (e.g., the object on a blank/white/muted background). The image analysis system 102 may then perform one or more processes on the processed image 118, the region of interest 117 within the processed image 118, or a combination thereof.

In some embodiments, the one or more processes performed by the image analysis system 102 may include determining one or more lines 122 that are present in the image 104, the processed image 118, the region of interest 117, or a combination thereof. The image analysis system 102 may use one or more line detection algorithms, such as the Canny edge detection algorithm, to identify lines 122 that are present in the image 104, the processed image 118, the region of interest 117, or a combination thereof. For example, the image analysis system 102 may process the image data 116 to determine gradients within the processed image 118, and may apply one or more thresholds to the gradients to identify patterns within the gradients that correspond to edges present in the processed image 118. In some embodiments, the image analysis system 102 may identify gradient patterns by performing a connected-component analysis that algorithmically determines connected regions in the processed image 118. The image analysis system 102 may suppress weak edges/lines that are not connected to strong edges/lines.

Once the image analysis service 102 determines patterns within the gradients that correspond to edges and/or lines, the image analysis system 102 may access a binary map that maps the location of pixels (and thus corresponding gradients) within the image 104, and use the binary map to identify the location of lines 122 in the image 104, the processed image 118, the region of interest 117, or a combination thereof. For example, the image analysis system 102 may determine that a line 122 exists at a location within the processed image 118 where the binary map indicates that one or more pixels corresponding to a gradient pattern indicative of an edge are located. In some embodiments, determining one or more lines 122 may include determining that one or more detected edges are part of a single edge (i.e., thus stitching two smaller lines 122 into a larger line 122).

In some embodiments, the one or more processes performed by the image analysis system 102 may include estimating vanishing points 124 for the object 106 based on the lines 122. A vanishing point 124 is an abstract point on an image plane where parallel lines in a 2D image depicting a 3D space appear to converge. In some embodiments, determining vanishing points 124 may correspond to extending one or more lines 122, and/or identifying points where multiple lines 122 converge. Alternatively, or in addition, determining vanishing points 124 may include determining groups of one or more lines 122 that converge to the same vanishing point 124. For example, the image analysis system 102 may group lines 122 into corresponding sets according to their distances, such as their Jaccard similarity coefficient, Jaccard distance, or a combination thereof. In some embodiments, the location of the vanishing points 124 may be estimated by the image analysis service 102 using a linear regression model.

When determining vanishing points 124, the image analysis system 102 may identify the strongest vanishing points 124 for the image 104. For example, the strongest vanishing point may be the vanishing point that occurs when the greatest number of lines meet, when the lines meet within the smallest area, when the lines that meet at the vanishing point are associated with the group of lines with the highest Jaccard similarity coefficient, etc. In some embodiments, the image analysis system 102 may identify a preset number of vanishing points 124 (e.g., the strongest three vanishing points), or may identify the vanishing points 124 that have a sufficient strength (e.g., where at least four lines 122 meet, linear regression model estimates strongest vanishing point 124, where multiple lines 122 cross within a region of space, etc.). Alternatively, or in addition, the image analysis system 102 may decide the number of vanishing points 124 that are to be determined based on the object 106. For example, where the image analysis system 102 has identified that the object 104 has a rectangular top surface, the image analysis system 102 may search for the strongest three vanishing points 124.

In some embodiments, the one or more processes performed by the image analysis system 102 may include determining the orientation 126 of the object 106 as depicted in the image 104 based on the vanishing points 124. In some embodiments, the image analysis system may use the vanishing points to estimate parameters of the camera that took the image, and determine the orientation 126 of the object with relation to the orientation of the image.

For example, if the image analysis system 102 assumes the image 104 follows a pinhole camera model (which can project objects in 3D world coordinate system into 2D image coordinate system), then a camera model representing a mapping function can be represented by Equation 1 as follows:

$$x = K[R,T]X \qquad (1)$$

where x denotes the image 104 coordinate system, X is the object 106 coordinate system, K denotes intrinsic parameters, R denotes a rotation matrix of extrinsic parameters, and T denotes a translation matrix of extrinsic parameters. The image analysis system 102 may estimate camera parameters associated with the image based on the vanishing points 124. Once the camera parameters are known, the image analysis system 102 may then determine a rotational matrix (R) that represents a rotational relationship in Euclidean space between the object coordinate system (X) and the image coordinate system (x). In the homogeneous coordinate system, the value x may correspond to a 3×1 vector, the value K may correspond to a 3×4 matrix, the value R may correspond a 4×3 matrix, the value T may correspond to a 4×1 vector, and the value X may correspond to a 4×1 vector.

The image analysis system 102 may then determine the orientation 126 of the object 106 as depicted in the image 104 based on the rotational matrix (R). For example, the image analysis system 102 may determine the relative position of individual axes of the object 106 (i.e., x-axis, y-axis, z-axis, etc.) in relation to the axes of the image 104 by using equation (1) with vanishing points. For example, the image analysis system 102 may determine, based on the rotational matric (R) one or more angular rotations/angular differences between individual axes' of the object 106 in relation to the corresponding axes of the image 104, such as the roll (i.e., z-axis difference), pitch (i.e., x-axis difference), and yaw (i.e., y-axis difference).

The one or more processes performed by the image analysis system 102 may also include determining whether the image 104 satisfies one or more image rules. The image rules may specify one or more parameters for the positioning and orientation of objects 106 in image 104. For example, the image rules may specify that the center of the object 106 in the image 104 must be located within a certain threshold of the center of the image 104, a ratio of the size of the object 106 to the size of the image 104, a range of angular rotations/angular differences between individual axes' of the object 106 in relation to the corresponding axes of the image 104, etc. The image analysis system 102 may then compare the orientation 126 of the object 106 as depicted in the image 104 to the image rules to determine whether to the image 104 satisfies the image rules.

In some embodiments, when the image analysis system 102 determines that the orientation 126 of the object 106 as depicted in the image 104 does not satisfy the image rules, the feedback module 114 may provide feedback 128 to the user 110. For example, where the image analysis system, 102 determines that the orientation 126 of one or more axes' of the object image is not within an acceptable angular rotations/angular differences with the axes' of the coordinate system of the image 104, the feedback module 114 may transmit a message to computing device 108 that includes a description of why the image 104 was rejected, instructions for taking an image 104 that will satisfy the image rules, or a combination thereof. In some embodiments, where the orientation 126 of the object 106 as depicted in the image 104 is within a threshold distance of satisfying the image rules (e.g., the roll of the object is within 10 degrees of acceptable the range of values specified by the image rules), the image analysis system 102 may perform one or more additional processing operations to automatically adjust the image 104 so that the object depicted as having an ideal orientation. FIG. 1 further illustrates each of the server 105 and computing devices 108 as being connected to a network 130, such as the internet.

Figure 2:
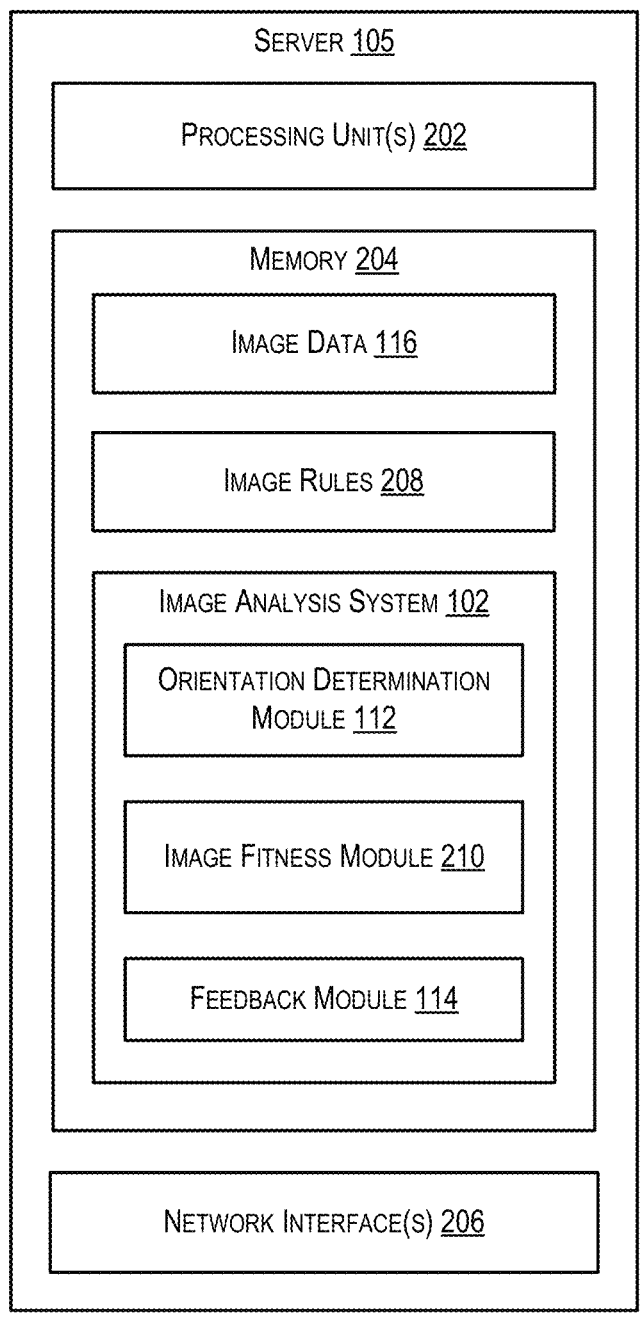
FIG. 2 is a block diagram of an illustrative computing architecture of the computing system shown in FIG. 1.

FIG. 2 is a block diagram of an illustrative computing architecture 200 for automatically determining the orientations of objects as depicted in images. The computing architecture 200 may be used to implement the various systems, devices, and techniques discussed above. In the illustrated implementation, the computing architecture 200 includes one or more processing units 202 coupled to a memory 204. The computing architecture 200 may also include a network interface 206. The network interface 206 may include physical and/or logical interfaces for connecting the respective server 105, to computing device 108, networks 130, etc. For example, the network interface 206 may enable WiFi-based communication such as via frequencies defined by the IEEE 802.11 standards, short range wireless frequencies such as Bluetooth®, or any suitable wired or wireless communications protocol that enables the respective computing device to interface with other computing devices.

The server 105 can include image data 116 and one or more image rules 118 stored on the memory 204. The image data 116 may correspond to data associated with image 104. The one or more image rules 118 correspond to one or more parameters for the positioning and orientation of objects 106 in image 104, where individual parameters correspond to an acceptable value or range of values (e.g., angle, angle ranges, degree value, range of degrees, percent difference, range of acceptable variance from a target value, etc.). For example, the image rules may specify that the center of the object 106 in the image 104 must be located within a certain threshold of the center of the image 104, a ratio of the size of the object 106 to the size of the image 104, a range of angular rotations/angular differences between individual axes' of the object 106 in relation to the corresponding axes of the image 104, etc.

The server 105 can also include an image analysis system 102 stored on the memory 204. The image analysis system 102 may be configured to automatically determine the orientations of an object as depicted in an image. The image analysis system 102 can include an orientation determination module 112, an image fitness module 210, and a feedback module 114.

The orientation determination module 112 can be executable by the one or more processing units 202 to determine the orientation of an object 106 depicted in an image 104. The orientation of an object 106 includes the relative position of the axes of the object 106 (i.e., x-axis, y-axis, z-axis, etc.) in relation to the axes of the image. In some embodiments, the orientation of an object 106 may be described using the angular rotation/angular difference between individual axes' of the object 106 in relation to the corresponding axes of the image, such as the roll (i.e., z-axis difference), pitch (i.e., x-axis difference), and yaw (i.e., y-axis difference).

In some embodiments, the orientation determination module 112 may determine a region of interest 117 in the image 104. The region of interest 117 may be determined based on a selection by the user 110 or another individual. For example, where the user 110 is providing the image 104 via an application associated with the image analysis system 102 (e.g., application, browser application, etc.), the application may present one or more functionalities that enable the user 110 to identify an object 106 depicted in the image 104, and/or a region of interest 117 associated with the object 106.

Alternatively, or in addition, the orientation determination module 112 may automatically determine the region of interest. For example, the orientation determination module 112 may scan the image data 116 associated with the image 104 to determine that the image 104 includes an object 106, and/or determining a location of the object 106 in the image 104. Once the orientation determination module 112 has identified the location of the object 106 in the image 104, the orientation determination module 112 may determine a region of interest 117 in the image 104 that includes the object 106.

In some embodiments, the orientation determination module 112 may determine one or more shapes associated with the object 106. For example, the orientation determination module 112 may determine that the object 106 includes a circular top. Alternatively, the orientation determination module 112 may determine one or more shapes associated with the object 106 based on information associated with the image 104. For example, where the image 104 is associated with a rectangular refrigerator, the orientation determination module 112 may determine that the object 106 will contain multiple rectangles based on information associated with the refrigerator (e.g., item description, merchant selections, user 110 inputs, other information, etc.).

The orientation determination module 112 may also generate a processed image 118 associated with the image 118. In some embodiments, the processed image 118 may correspond to a modified version of the image 104, but with one or more background elements 120 removed. For example, once the orientation determination module 112 has identified the object 106 in the image 104, the orientation determination module 112 generate the processed image 118 by removing portions of the image 104 that do not correspond to the object 106, such as backgrounds, walls, floors, other objects in the image, etc. In this way, the orientation determination module 112 may generate the processed image 118 that includes the object 116 and minimal other elements (e.g., the object on a blank/white/muted background). The orientation determination module 112 then perform additional processes on the processed image 118, the region of interest 117 within the processed image 118, or a combination thereof.

In some embodiments, the orientation determination module 112 may determine one or more lines 122 that are present in the image 104, the processed image 118, the region of interest 117, or a combination thereof. The orientation determination module 112 may use one or more line detection algorithms, such as the Canny edge detection algorithm, to identify lines 122 that are present in the image 104, the processed image 118, the region of interest 117, or a combination thereof. For example, the orientation determination module 112 may process the image data 116 to determine gradients within the processed image 118, and may apply one or more thresholds to the gradients to identify patterns within the gradients that correspond to edges present in the processed image 118. In some embodiments, the orientation determination module 112 may identify gradient patterns by performing a connected-component analysis that algorithmically determines connected regions in the processed image 118. The orientation determination module 112 may suppress weak edges/lines that are not connected to strong edges/lines.

Once the orientation determination module 112 determines patterns within the gradients that correspond to edges and/or lines, the orientation determination module 112 may access a binary map that maps the location of pixels (and thus corresponding gradients) within the image 104, and use the binary map to identify the location of lines 122 in the image 104, the processed image 118, the region of interest 117, or a combination thereof. For example, the orientation determination module 112 may determine that a line 122 exists at a location within the processed image 118 where the binary map indicates that one or more pixels corresponding to a gradient pattern indicative of an edge are located. In some embodiments, determining one or more lines 122 may include determining that one or more detected edges are part of a single edge (i.e., thus stitching two smaller lines 122 into a larger line 122).

In some embodiments, the one or more processes performed by the orientation determination module 112 may include estimating vanishing points 124 for the object 106 based on the lines 122. A vanishing point 124 is an abstract point on an image plane where parallel lines in a 2D image depicting a 3D space appear to converge. In some embodiments, determining vanishing points 124 may correspond to extending one or more lines 122, and/or identifying points where multiple lines 122 converge. Alternatively, or in addition, determining vanishing points 124 may include determining groups of one or more lines 122 that converge to the same vanishing point 124. For example, the orientation determination module 112 may group lines 122 into corresponding sets according to their distances, such as Jaccard similarity coefficient, Jaccard distance, or a combination thereof. In some embodiments, the location of the vanishing points 124 may be estimated by the orientation determination module 112 using a linear regression model.

When determining vanishing points 124, the orientation determination module 112 may identify the strongest vanishing points 124 for the image 104. In some embodiments, the orientation determination module 112 may identify a preset number of vanishing points 124 (e.g., the strongest three vanishing points), or may identify the vanishing points 124 that have a sufficient strength (e.g., where at least four lines 122 meet, linear regression model estimates strongest vanishing point 124, where multiple lines 122 cross within a region of space, etc.). Alternatively, or in addition, the orientation determination module 112 may decide the number of vanishing points 124 that are to be determined based on the object 106. For example, where the orientation determination module 112 has identified that the object 104 has a rectangular top surface, the orientation determination module 112 may search for the strongest three vanishing points 124.

In some embodiments, the orientation determination module 112 may determine the orientation of the object 106 as depicted in the image 104 based on the vanishing points 124. In some embodiments, the orientation determination module 112 may use the vanishing points to estimate parameters of the camera that took the image, and determine the orientation of the object with relation to the orientation of the image.

For example, if the orientation determination module 112 assumes the image 104 follows a pinhole camera model (which can project objects in 3D world coordinate system into 2D image coordinate system), the orientation determination module 112 may estimate camera parameters associated with the image based on the vanishing points 124. Once the camera parameters are known, the orientation determination module 112 may determine the orientation of the object 106 as depicted in the image 104. For example, the orientation determination module 112 may determine the relative position of individual axes of the object 106 (i.e., x-axis, y-axis, z-axis, etc.) in relation to the axes of the image 104. The orientation determination module 112 may determine one or more angular rotations/angular differences between individual axes' of the object 106 in relation to the corresponding axes of the image 104, such as the roll (i.e., z-axis difference), pitch (i.e., x-axis difference), and yaw (i.e., y-axis difference). For example, the orientation determination module 112 may determine the orientation using formula (1) described above.

The image fitness module 210 can be executable by the one or more processing units 202 to determine whether the image 104 satisfies one or more image rules 208. In some embodiments, the image fitness module 210 may access the image rules 208 to determine one or more parameters for the positioning and orientation of objects 106 in image 104. The image fitness module 210 may then compare the orientation of the object 106 as depicted in the image 104 to the image rules to determine whether to the image 104 satisfies the one or more parameters.

The feedback module 114 can be executable by the one or more processing units 202 to provide feedback 128 to computing device 108 with regard to image 104. For example, where the fitness module 210 determines that the image 104 satisfies the image rules 208, the feedback module 114 may transmit a message and/or notification to computing device 108 that the image 104 is approved. Alternatively, if the fitness module 210 determines that the orientation of the object 106 as depicted in the image 104 does not satisfy the image rules 208, the feedback module 114 may transmit a feedback 128 to computing device 108 that includes a description of why the image 104 was rejected, instructions for taking an image 104 that will satisfy the image rules, or a combination thereof.

In some embodiments, where the orientation of the object 106 as depicted in the image 104 is within a threshold distance of satisfying the image rules (e.g., the roll of the object is within 10 degrees of acceptable the range of values specified by the image rules), the image analysis system 102 may perform one or more additional processing operations to automatically adjust the image 104 so that the object depicted as having an ideal orientation. That is, if the image analysis system 102 determines that the orientation of the object is within a threshold difference (e.g., plus or minus a threshold percentage, a threshold numerical amount, etc.) of the image rules, then the image analysis system 102 may perform one or more additional processing operations to automatically adjust the image 104 so that the object depicted as having an ideal orientation.

Those skilled in the art will appreciate that the computing architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The computing architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

The one or more processing unit(s) 202 may be configured to execute instructions, applications, or programs stored in the memory 204. In some examples, the one or more processing unit(s) 202 may include hardware processors that include, without limitation, a hardware central processing unit (CPU), a graphics processing unit (GPU), and so on. While in many instances the techniques are described herein as being performed by the one or more processing units 202, in some instances the techniques may be implemented by one or more hardware logic components, such as a field programmable gate array (FPGA), a complex programmable logic device (CPLD), an application specific integrated circuit (ASIC), a system-on-chip (SoC), or a combination thereof.

The memory 204 is an example of computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device. In general, computer storage media may include computer-executable instructions that, when executed by one or more processing units, cause various functions and/or operations described herein to be performed. In contrast, communication media embodies computer-readable instructions, data structures, program modules, or other data in a modulated data signal, such as a carrier wave, or other transmission mechanism. As defined herein, computer storage media does not include communication media.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated computing architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the computing architecture 200 may be transmitted to the computing architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium.

The architectures, systems, and individual elements described herein may include many other logical, programmatic, and physical components, of which those shown in the accompanying figures are merely examples that are related to the discussion herein.

Figure 3:
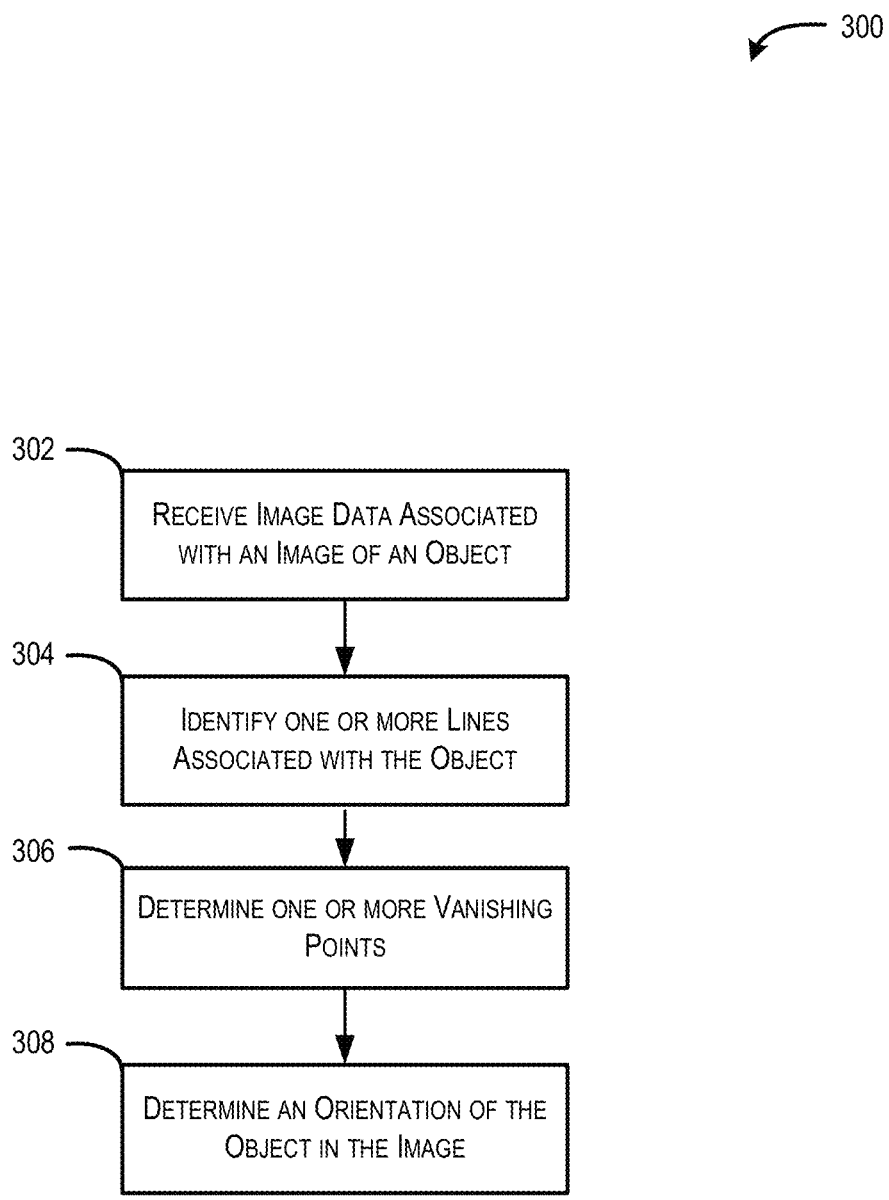
FIG. 3 is a flow diagram of an illustrative process to determine the orientation of an object as depicted in an image.
Figure 8:
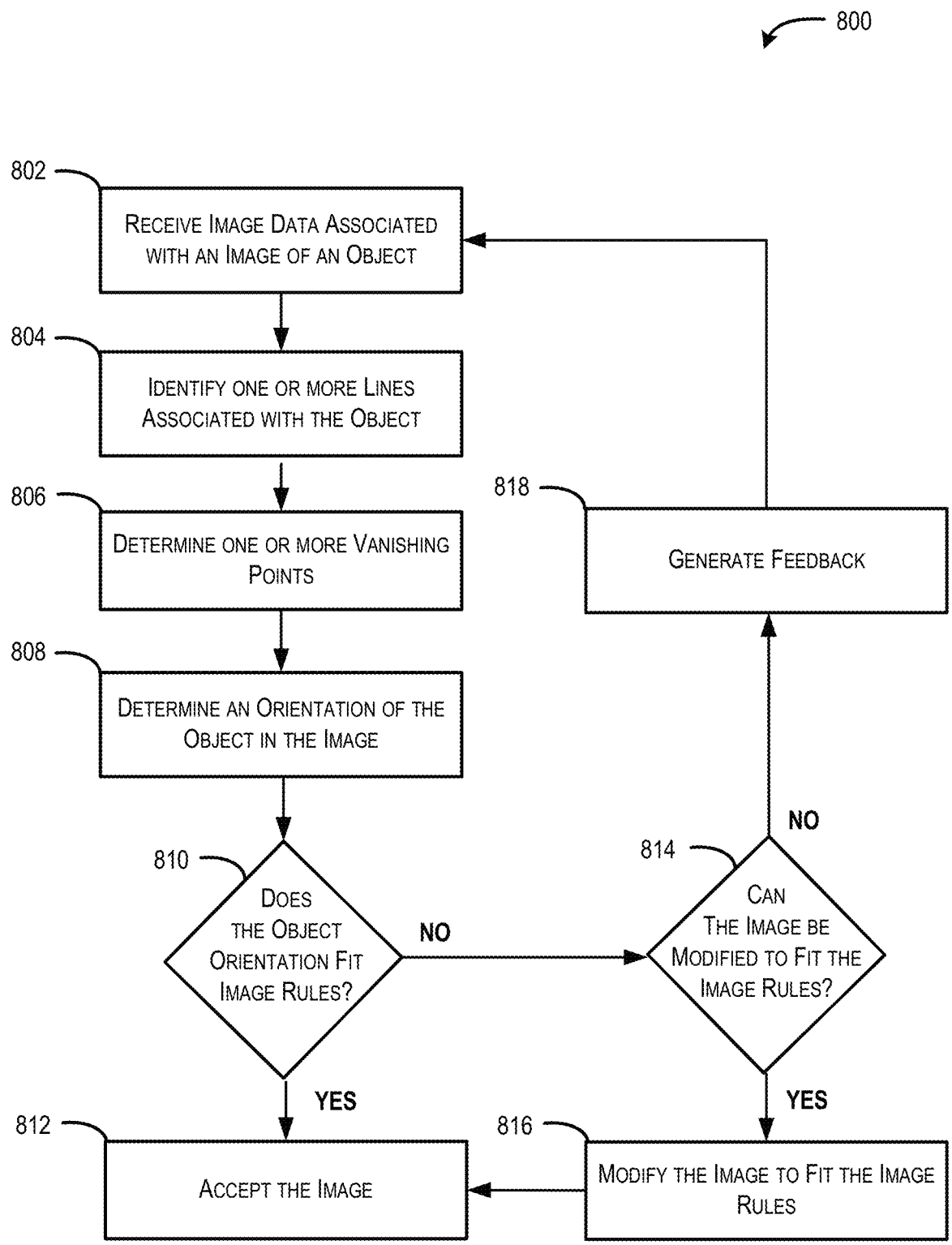
FIG. 8 is a flow diagram of an illustrative process for analyzing images based on the orientations of objects depicted in the images.

FIGS. 3 and 8 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 to determine the orientation of an object as depicted in an image. The process 300 may be implemented in the environment 100 and by the computing architecture 200 described above, or in other environments and architectures.

At 302, the image analysis system 102 receives image data associated with an image of an object. For example, the image analysis system 102 may receive image data 116 associated with an image 104 via an application or website interface associated with the image analysis system 120. For example, an image uploader 110 may upload an image via an application executing on their computing device 108.

At 304, the image analysis system 102 identifies one or more lines associated with the object. In some embodiments, identifying the one or more lines corresponds to determining one or more edges of the object. Identifying one or more lines may also include determining lines in the image that correspond to patterns (e.g., printed patterns, stitched/woven patterns, the grain of wooden components, etc.) or stylistic lines (e.g., embossed or etched patterns, carved designs, joints between components, etc.) associated with the object. In some embodiments, in response to the image analysis system 102 determining both edges and patterns/stylistic lines associated with an object, the image analysis system 102 may disregard the patterns/stylistic line, and conduct further processing based on the identified edges of the object. Alternatively, in response to the image analysis system 102 determining both edges and patterns/stylistic lines associated with an object, the image analysis system 102 may disregard a first portion of the patterns/stylistic lines that do not match the edges of the object, and conduct further processing based on the identified edges of the object and a second portion of the patterns/stylistic lines that do match the edges of the object. For example, if the printed/stylistic lines are a square table, and the printed/stylistic lines correspond to a checkered tablecloth where the checkers align with the edges of the table, the image analysis system 102 may use the printed/stylistic lines associated with the checkers when determining the orientation of the object.

In some embodiments, the image analysis system 102 may use one or more line detection algorithms (e.g., Canny edge detection algorithm) to identify lines 122 that are present in the image 104. For example, the image analysis system 102 may process the image data 116 associated with the image 104 to determine gradients within the image 104, and may apply one or more thresholds to the gradients to identify patterns within the gradients that correspond to edges present in the image 104. In some embodiments, the image analysis system 102 may identify gradient patterns by performing a connected-component analysis that algorithmically determines connected regions in the image 104. The image analysis system 102 may suppress weak edges/lines that are not connected to strong edges/lines.

The image analysis service 102 may access a binary map that maps the location of pixels (and thus corresponding gradients) within the image 104, and use the binary map to identify the location of lines 122 in the image 104. For example, the image analysis system 102 may determine that a line 122 exists at a location within the image 104 where the binary map indicates that one or more pixels corresponding to a gradient pattern indicative of an edge are located.

At 306, the image analysis system 102 determines one or more vanishing points. A vanishing point 124 is an abstract point on an image plane where parallel lines in a 2D image depicting a 3D space appear to converge. In some embodiments, determining vanishing points 124 may correspond to extending one or more lines 122, and/or identifying points where multiple lines 122 converge. Alternatively, or in addition, determining vanishing points 124 may include determining groups of one or more lines 122 that converge to the same vanishing point 124. For example, the image analysis system 102 may group lines 122 into corresponding sets according to their Jaccard similarity coefficient, Jaccard distance, or a combination thereof. In some embodiments, the location of the vanishing points 124 may be estimated by the image analysis service 102 using a linear regression model.

The image analysis system 102 may identify the strongest vanishing points 124 for the image 104, may identify a preset number of vanishing points 124 (e.g., the strongest three vanishing points), may identify the vanishing points 124 that have a sufficient strength, or a combination thereof. Alternatively, or in addition, the image analysis system 102 may decide the number of vanishing points 124 that are to be determined based on the object 106. For example, where the image analysis system 102 has identified that the object 104 has a rectangular top surface, the image analysis system 102 may search for the strongest three vanishing points 124.

At 308, the image analysis system 102 determines an orientation of the object in the image. In some embodiments, the image analysis system may use the vanishing points to estimate parameters of the camera that took the image, and determine the orientation of the object with relation to the orientation of the camera/image. The image analysis system 102 may determine the relative position of individual axis of the object 106 (i.e., x-axis, y-axis, z-axis, etc.) in relation to the axis of the image 104. For example, the image analysis system 102 may determine one or more angular rotations/angular differences between individual axis' of the object 106 in relation to the corresponding axis of the image 104, such as the roll (i.e., z-axis difference), pitch (i.e., x-axis difference), and yaw (i.e., y-axis difference).

Figure 4A:
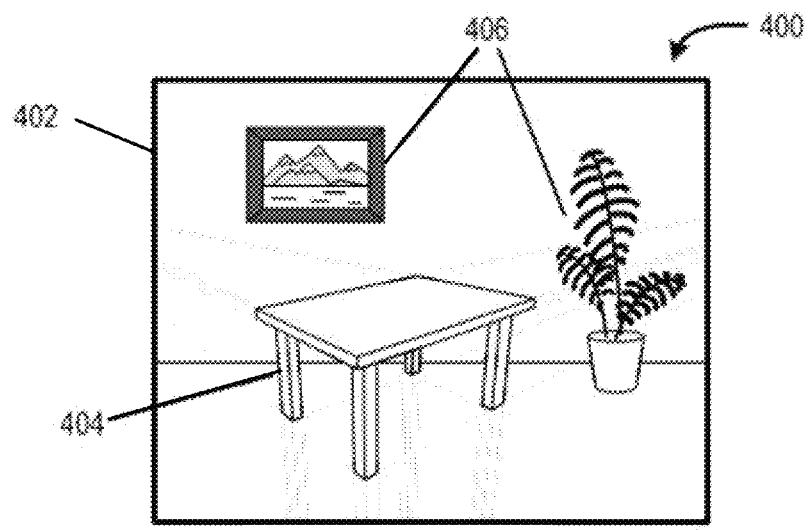
FIGS. 4A and 4B are schematic diagrams that illustrate an image depicting an object and a processed image.
Figure 4B:
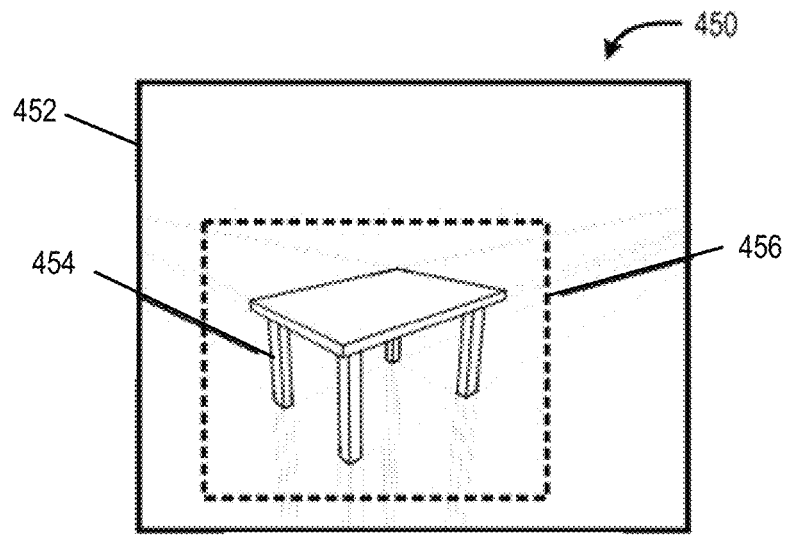

FIGS. 4A and 4B are schematic diagrams that illustrate an image depicting an object and a processed image. FIG. 4A shows an image 402 depicting an object 404. Image 402 also includes background objects 406, such as pictures, plants, etc. FIG. 4B shows a processed image 452 depicting the object 454. The processed image 452 may be a new image file, or may be the same image as image 104. The processed image 452 may depict a region of interest 456 that includes the object 454.

Figure 5A:
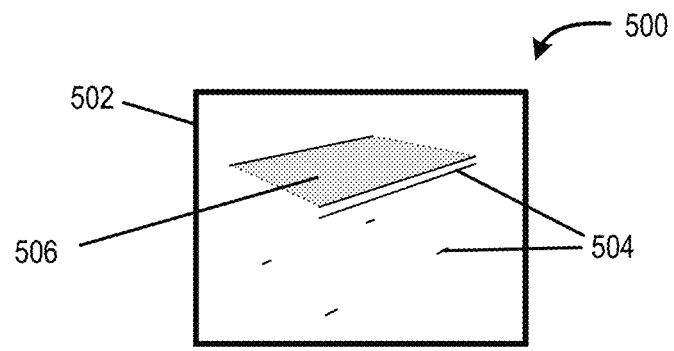
FIGS. 5A, 5B, and 5C are schematic diagrams that illustrate groups of component lines of an object.
Figure 5B:
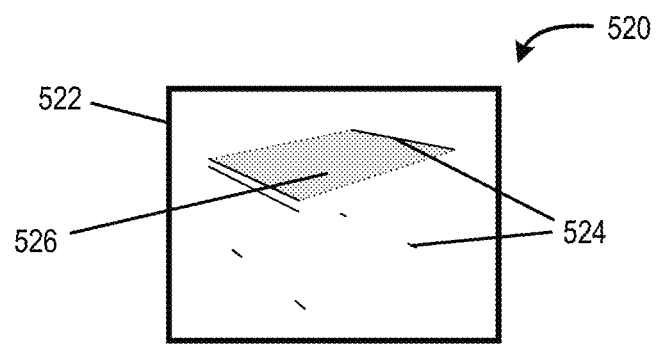
Figure 5C:
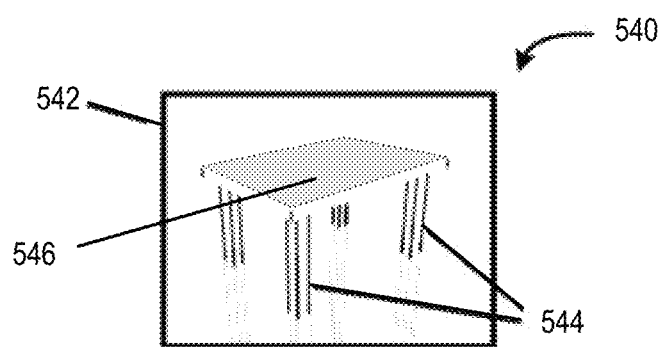

FIGS. 5A, 5B, and 5C are schematic diagrams that illustrate groups of component lines of an object. FIG. 5A shows an image 502 depicting a first set of lines 504 that make up an object. The first set of lines 504 correspond to a group of lines that are drawn along a first axis of the object. FIG. 5B shows an image 522 depicting a second set of lines 524 that make up an object. The second set of lines 524 correspond to a group of lines that are drawn along a second axis of the object. FIG. 5C shows an image 542 depicting a third set of lines 544 that make up an object. The third set of lines 544 correspond to a group of lines that are drawn along a third axis of the object. FIGS. 5A, 5B, and 5C further shows a shape 506 associated with the object that is constructed using lines from first set of lines 504 and the second set of lines 524. The shape 506 corresponds to a rectangular upper surface of the object. When considered together, the first set of lines 504 depicted in FIG. 5A, the second set of lines 524 depicted in FIG. 5B, and the third set of lines 544 depicted in FIG. 5C form the object.

FIGS. 6A, 6B, and 6C are schematic diagrams that illustrate vanishing points where different sets of lines from an image meet. FIG. 6A shows an image 602 depicting a first set of lines that make up an object, where the lines have been extended 604. Image 602 also includes a vanishing point 606 where the extended lines 604 meet. FIG. 6B shows an image 622 depicting a second set of lines that make up an object, where the lines have been extended 624. Image 622 also includes a vanishing point 626 where the extended lines 624 meet. FIG. 6C shows an image 642 depicting a third set of lines that make up an object, where the lines have been extended 644. Image 642 also includes a vanishing point 646 where the extended lines 644 meet.

Figure 7A:
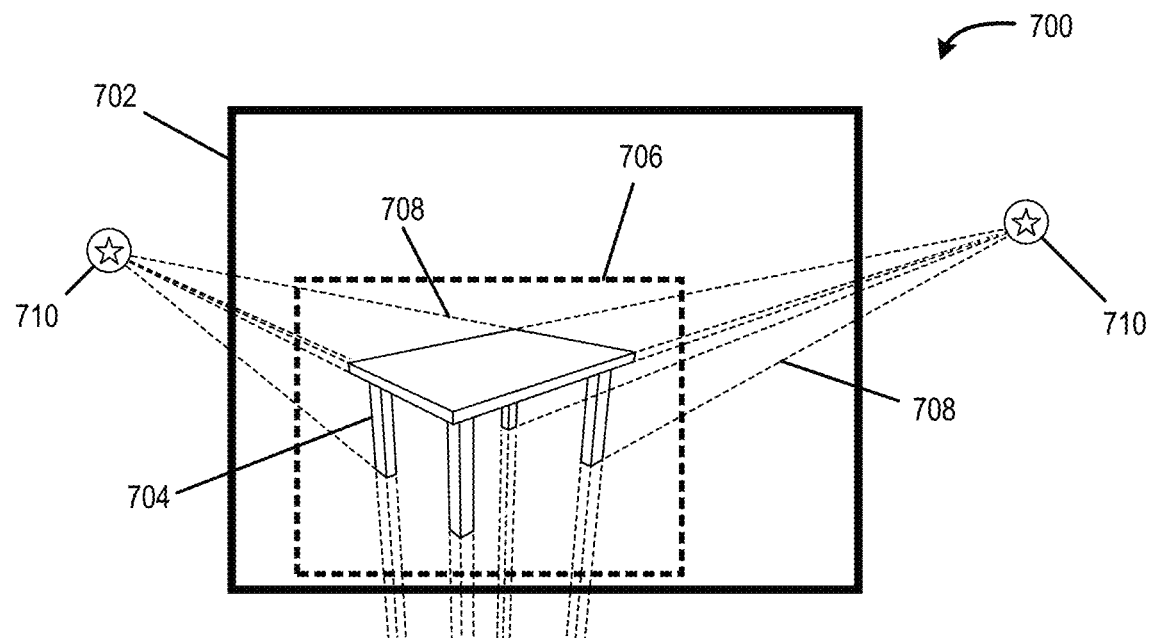
FIGS. 7A and 7B are schematic diagrams that illustrate images that have been processed to determine the vanishing points associated with an object.
Figure 7B:
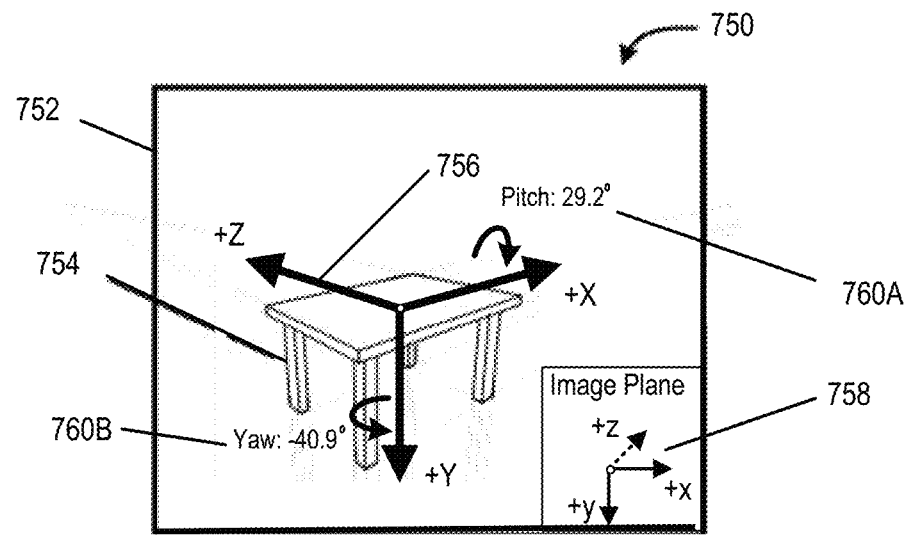

FIGS. 7A and 7B are schematic diagrams that illustrate images that have been processed to determine the vanishing points associated with an object and the orientation of the object as depicted in the image. FIG. 7A shows an image 702 depicting an object 704. Image 702 also includes a region of interest 706 that includes the object 704. FIG. 7A also shows the lines that make up the object 704 being extended 708, and a vanishing point 710 where the extended lines 708 meet. FIG. 7B shows image 552 that depicts and object 754. FIG. 7B also shows the orientation 756 of the object as depicted in the image. Orientation 756 is show as having an +X-axis, a +Y-axis, and a +Z-axis. FIG. 7B further shows an orientation of the image 758, that has an +x-axis, a +y-axis, and a +z-axis. FIG. 7B also identifies a first relative position (i.e., the pitch) 760A of the orientation of the object and the orientation of the image as being 29.2 degrees, and a second relative position (i.e., the yaw) 760B of the orientation of the object and the orientation of the image as being −40.9 degrees.

FIG. 8 is a flow diagram of an illustrative process 800 for analyzing images based on the orientations of objects depicted in the images. The process 800 may be implemented in the environment 100 and by the computing architecture 200 described above, or in other environments and architectures.

At 802, the image analysis system 102 receives image data associated with an image of an object. For example, the image analysis system 102 may receive image data 116 associated with an image 104 via an application or website interface associated with the image analysis system 120. For example, an image uploader 110 may upload an image via an application executing on their computing device 108.

The image analysis service 102 may access a binary map that maps the location of pixels (and thus corresponding gradients) within the image 104, and use the binary map to identify the location of lines 122 in the image 104. For example, the image analysis system 102 may determine that a line 122 exists at a location within the image 104 where the binary map indicates that one or more pixels corresponding to a gradient pattern indicative of an edge are located.

At 804, the image analysis system 102 identifies one or more lines associated with the object. For example, the image analysis system 102 may use one or more line detection algorithms (e.g., Canny edge detection algorithm) to identify lines 122 that are present in the image 104. For example, the image analysis system 102 may process the image data 116 associated with the image 104 to determine gradients within the image 104, and may apply one or more thresholds to the gradients to identify patterns within the gradients that correspond to edges present in the image 104. In some embodiments, the image analysis system 102 may identify gradient patterns by performing a connected-component analysis that algorithmically determines connected regions in the image 104. The image analysis system 102 may suppress weak edges/lines that are not connected to strong edges/lines. In some embodiment, processing the image to identify the one or more lines associated with the object may include identifying a region of interest within the image that includes the object, and processing the region of the image that corresponds to the region of interest.

At 806, the image analysis system 102 determines one or more vanishing points. A vanishing point 124 is an abstract point on an image plane where parallel lines in a 2D image depicting a 3D space appear to converge. In some embodiments, determining vanishing points 124 may correspond to extending one or more lines 122, and/or identifying points where multiple lines 122 converge. Alternatively, or in addition, determining vanishing points 124 may include determining groups of one or more lines 122 that converge to the same vanishing point 124. For example, the image analysis system 102 may group lines 122 into corresponding sets according to their Jaccard similarity coefficient, Jaccard distance, or a combination thereof. In some embodiments, the location of the vanishing points 124 may be estimated by the image analysis service 102 using a linear regression model.

The image analysis system 102 may identify the strongest vanishing points 124 for the image 104, may identify a preset number of vanishing points 124 (e.g., the strongest three vanishing points), may identify the vanishing points 124 that have a sufficient strength, or a combination thereof. Alternatively, or in addition, the image analysis system 102 may decide the number of vanishing points 124 that are to be determined based on the object 106. For example, where the image analysis system 102 has identified that the object 104 has a rectangular top surface, the image analysis system 102 may search for the strongest three vanishing points 124.

At 808, the image analysis system 102 determines an orientation of the object in the image. In some embodiments, the image analysis system may use the vanishing points to estimate parameters of the camera that took the image, and determine the orientation of the object with relation to the orientation of the camera/image. The image analysis system 102 may determine the relative position of individual axes of the object 106 (i.e., x-axis, y-axis, z-axis, etc.) in relation to the axes of the image 104. For example, the image analysis system 102 may determine one or more angular rotations/angular differences between individual axes' of the object 106 in relation to the corresponding axes of the image 104, such as the roll (i.e., z-axis difference), pitch (i.e., x-axis difference), and yaw (i.e., y-axis difference).

At 810, the image analysis system 102 determines whether the object orientation fits image rules. The image rules may specify one or more parameters for the positioning and orientation of objects 106 in image 104. For example, the image rules may specify that the center of the object 106 in the image 104 must be located within a certain threshold of the center of the image 104, a ratio of the size of the object 106 to the size of the image 104, a range of angular rotations/angular differences between individual axis' of the object 106 in relation to the corresponding axis of the image 104, etc. The image analysis system 102 may then compare the orientation of the object 106 as depicted in the image 104 to the image rules to determine whether to the image 104 satisfies the image rules.

If the answer at 810 is "yes" (the object orientation fits the image rules), then the process moves to 812, and the image analysis system 102 accepts the image. If the answer at 810 is "no" (the object orientation does not fit the image rules), then the process moves to 814, and the image analysis system 102 determines whether the image can be modified to fit the image rules. If the answer at 814 is "yes" (the image can be modified to fit the image rules), then the process moves to 816, and the image analysis system 102

At 816, the image analysis system 102 modifies the image to fit the image rules. For example, where the orientation of the object 106 as depicted in the image 104 is within a threshold distance of satisfying the image rules (e.g., the roll of the object is within 10 degrees of acceptable the range of values specified by the image rules), the image analysis system 102 may perform one or more additional processing operations to automatically adjust the image 104 so that the object depicted as having an ideal orientation.

If the answer at 814 is "no" (new item performance data does not indicate a change in consumer interest in the item), then the process moves to 818 and the image analysis system 102 generates feedback. For example, the image analysis system 102 may generate and provide feedback to the user 110 on how to take a picture that satisfies the image rules. Alternatively, where the image analysis system 102 is associated with a camera, the feedback may include instructions of how to move the camera so as to capture a picture that satisfies the image rules. The feedback may include a description of why the image was rejected, instructions for taking an image that will satisfy the image rules, or a combination thereof.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors;
memory; and
one or more computer-executable instructions that are stored in the memory and that are executable by the one or more processors to perform operations comprising:
receiving image data associated with an image depicting an object;
determining, based on the object, a number of vanishing points to be determined;
determining, based on the image data, edges associated with a shape of the object;
determining, based on the edges, the number of vanishing points associated with the object;
determining, based on the vanishing points, an orientation of the object as depicted in the image;
accessing an image rule that specifies one or more acceptable orientations of the object;
outputting an indication, based on the orientation of the object being within the one or more acceptable orientations, of whether the image satisfies the image rule;
determining, based on the vanishing points, a rotational relationship between the orientation and another orientation of the image;
determining that the rotational relationship does not meet one or more parameters for object orientation; and
generating, based on the rotational relationship not meeting the one or more parameters, feedback including instructions for taking an image that depicts the object having a new orientation that meets the one or more parameters.

2. The system as recited in claim 1, wherein determining the edges comprises:
determining a region of interest associated with the object; and
analyzing image data associated with the region of interest to determine the edges.

3. The system as recited in claim 1, wherein determining the orientation comprises estimating, based on the vanishing points, parameters of a camera associated with the image; and
determining, based on the parameters of the camera, a rotational matrix that represents the rotational relationship between the orientation and the other orientation of the image.

4. The system as recited in claim 1, wherein determining the vanishing points comprises estimating a point in a two-dimensional space of the image where at least two lines of the edges intersect.

5. A method comprising:
receiving image data associated with an image depicting an object;
determining, based on the object, a number of vanishing points to be determined;
determining, based on the image data, a plurality of lines associated with the object depicted in the image;
determining, based on the plurality of lines, the vanishing points associated with the object;
determining, based on the vanishing points, a rotational relationship between a first orientation of the object as depicted in the image and a second orientation of the image;
determining that the rotational relationship does not meet one or more parameters for object orientation;
determining that the rotational relationship is within a threshold difference of the one or more parameters for object orientation; and
generating, based on the rotational relationship being within the threshold difference of the one or more parameters, a modified image, wherein the modified image depicts the object as having a new orientation that meets the one or more parameters.

6. The method as recited in claim 5, wherein determining the rotational relationship comprises:
estimating, based on the vanishing points, one or more camera parameters associated with the image; and
determining, based on the one or more camera parameters, a rotational matrix that represents the rotational relationship.

7. The method as recited in claim 5, wherein determining the plurality of lines comprises:
determining a region of interest associated with the object; and analyzing image data associated with the region of interest to determine edges of the object depicted in the image.

8. The method as recited in claim 7, wherein analyzing the image data includes evaluating the image data associated with the region of interest using a Canny edge detection algorithm.

9. The method as recited in claim 5, wherein determining the vanishing points comprises estimating a point in a two-dimensional space of the image where at least two lines of the plurality of lines intersect.

10. The method as recited in claim 5, further comprising generating, based on the first orientation of the object not meeting the one or more parameters, feedback including instructions for taking an image that depicts the object having the new orientation that meets the one or more parameters.

11. The method as recited in claim 5, further comprising:
analyzing the image data to determine a position of the object depicted in the image; and
determining a region of interest based on the position of the object.

12. The method as recited in claim 5, further comprising generating, based on the image data, a processed image, wherein generating the processed image includes:
determining one or more elements depicted in the image other than the object; and
removing the one or more elements from the image.

13. A system comprising:
one or more processors;
memory; and
one or more computer-executable instructions that are stored in the memory and that are executable by the one or more processors to perform operations comprising:
receiving image data associated with an image depicting an object;
determining, based on the object, a number of vanishing points to be determined;
determining, based on the image data, a plurality of lines associated with the object depicted in the image;
determining, based on the plurality of lines, the vanishing points associated with the object;
determining, based on the vanishing points, a rotational relationship between a first orientation of the object as depicted in the image and a second orientation of the image;
determining that the rotational relationship does not meet one or more parameters for object orientation;
determining that the rotational relationship is within a threshold difference of the one or more parameters for object orientation; and
generating, based on the rotational relationship being within the threshold difference of the one or more parameters, a modified image, wherein the modified image depicts the object as having a new orientation that meets the one or more parameters.

14. The system as recited in claim 13, further comprising additional computer-executable instructions that are stored in the memory and that are executable by the one or more processors to perform additional operations comprising:
estimating, based on the vanishing points, one or more parameters of a camera associated with the image; and
determining, based on the one or more parameters of the camera, a rotational matrix that represents the rotational relationship between the first orientation of the object as depicted in the image and the second orientation of the image.

15. The system as recited in claim 13, wherein determining the vanishing points comprises:
determining a group of the plurality of lines based on a Jaccard similarity coefficient and/or a Jaccard distance of the group of the plurality of lines; and
estimating a point in a two-dimensional space of the image where at least two lines of the group of the plurality of lines intersect.

16. The system as recited in claim 13, wherein determining the plurality of lines associated with the object comprises:
determining, based on the image data, one or more gradients within the image associated with a shape of the object; and
determining, based on the one or more gradients, an edge associated with the object.

17. The system as recited in claim 16, wherein determining the plurality of lines associated with the object further comprises determining, based on a map of locations of pixels in the image, a location of the edge in the image.

18. The system as recited in claim 13, further comprising additional computer-executable instructions that are stored in the memory and that are executable by the one or more processors to perform additional operations comprising:
determining, based on the image data, a shape associated with the object; and
wherein the vanishing points associated with the object are determined based on the shape.

19. The system as recited in claim 14, wherein the one or more parameters of the camera comprise a focal length of a lens of the camera.

20. The system as recited in claim 1, wherein the orientation of the object includes a relative position of a first axis of the object in relation to a second axis of the image used to capture the image.

* * * * *